W. F. ZIMMERMANN.
GEAR CUTTING MACHINE.
APPLICATION FILED JUNE 7, 1915.
1,206,971.
Patented Dec. 5, 1916.
2 SHEETS—SHEET 1.
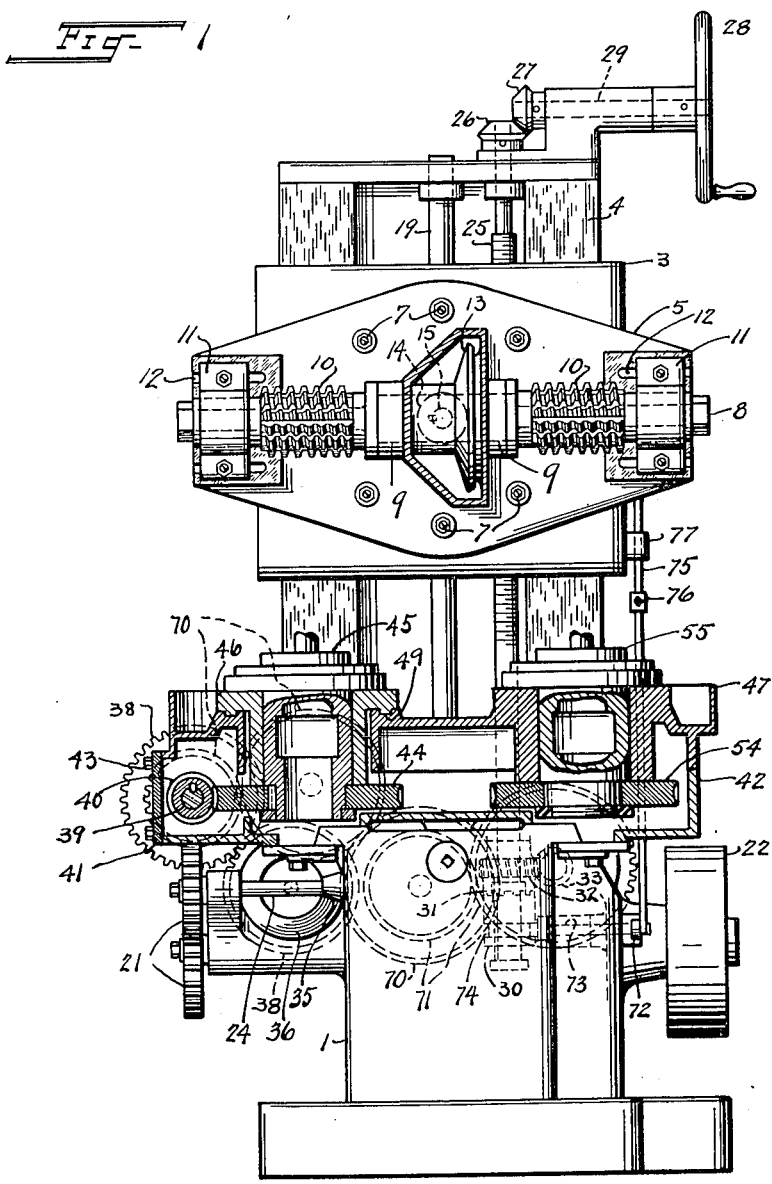
INVENTOR
William F. Zimmermann

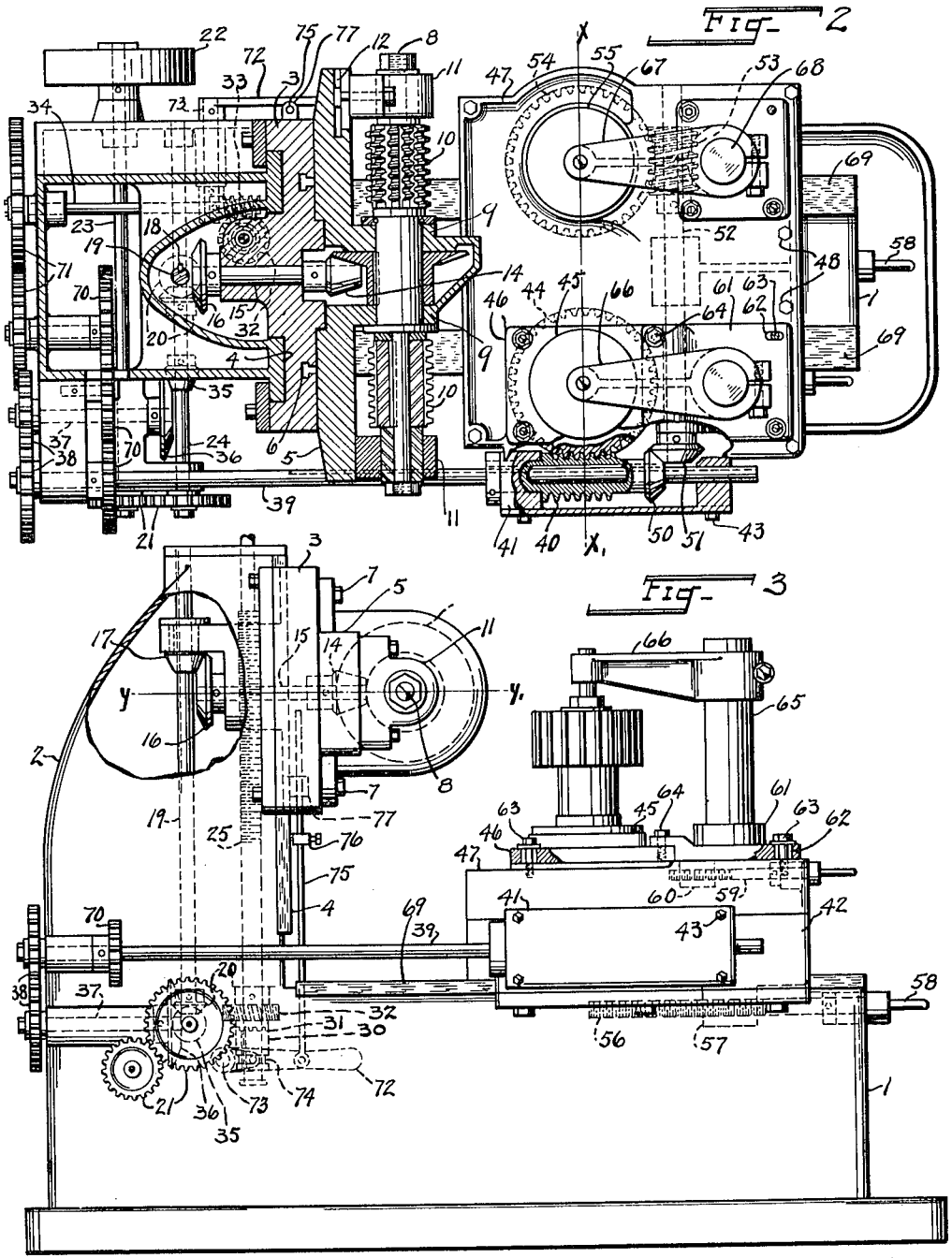

UNITED STATES PATENT OFFICE.

WILLIAM F. ZIMMERMANN, OF NEWARK, NEW JERSEY, ASSIGNOR TO GOULD & EBERHARDT, OF NEWARK, NEW JERSEY, A CORPORATION OF NEW JERSEY.

GEAR-CUTTING MACHINE.

1,206,971.   Specification of Letters Patent.   Patented Dec. 5, 1916.

Application filed June 7, 1915. Serial No. 32,487.

*To all whom it may concern:*

Be it known that I, WILLIAM F. ZIMMERMANN, a citizen of the United States, and a resident of Newark, in the county of Essex and State of New Jersey, have invented certain new and useful Improvements in Gear-Cutting Machines, and do hereby declare the following specification, taken in connection with the drawings forming part of same, to be a full, clear, concise, and exact description of the invention and the best mode contemplated to apply said principle, so as to distinguish it from other inventions, and to enable any person skilled in the art to which it appertains or with which it is most nearly connected to make, construct, and use the same.

This invention relates primarily to a machine organized and adapted to cut spur and helical gear wheels, and more particularly to that class of machines utilizing helical or hob cutters and generally known as hobbing machines.

This invention contemplates as its primary object, the coöperation of two revolving work spindles mounted in the same sliding member with two helical cutting members revolubly mounted on one and the same spindle.

Another object is to render one of the work spindles independently adjustable of the other so that the same thickness of tooth can be cut in the gear blank on each spindle, notwithstanding there may be a difference in the diameters of the helical cutting members.

Other objects will be apparent from, and are incorporated in the annexed drawings, and in the following description, which sets forth in detail, certain contrivances embodying means constituting however, but one of the various mechanical forms in which the principle of the invention may be used.

The novelty of the invention will be readily understood from the drawings, which show a construction for practising the invention in its preferred form, and from the following description thereof, and is more specifically pointed out and distinctly claimed in the claims annexed to said description.

In the drawings:—Figure 1 is a front elevation of a gear cutting machine embodying the features of this invention in its preferred form. The work spindles are shown in the section taken at X $X_1$ of Fig. 2. Fig. 2 is a plan view of a gear cutting machine with the cutter spindle carriages in section, taken at Y $Y_1$ of Fig. 3. Fig. 3 is a side elevation of the mechanism to practise the invention.

The main frame 1 is provided at one end thereof with a stanchion 2 preferably integral therewith. The cutter carriage 3 is slidably mounted upon the ways 4 provided on said stanchion 2. An angularly adjustable member 5 is arranged upon said cutter slide 3 and secured thereto in any angular position by means of the T slot 6 and bolts 7.

A cutter spindle 8 is rotatably mounted in suitable bearings 9 provided on said angularly adjustable slide 5 and has keyed thereto and rotatable therewith, two helical cutters 10. Two outer bearings 11 are adjustably arranged at each end of said adjustable slide 5 to support the ends of the cutter spindle 8. T slots 12 and suitable bolts are provided in each of said end bearings 11 to secure same to the swivel slide 5. A bevel gear 13 is keyed to said cutter spindle 8 and meshes with and is rotated by the pinion 14. A shaft 15, to which said pinion 14 is secured, is rotatably mounted in the center of the cutter slide 3. Said shaft 15 is the pivotal center of the angularly adjustable slide 5 and insures a driving connection between said pivotal shaft 15 and cutter spindle 8 when said cutter spindle is adjusted to any angular position.

A bevel gear 16 is secured to the other end of said shaft 15, and meshes with the bevel pinion 17, which is rotatably mounted in said slide 3 and has a slidable key connection 18 with the vertical cutter driving shaft 19. Motion is transmitted to said vertical cutter driving shaft from the pulley 22 by the intermediate means of a pair of bevel gears 20 and change gears 21. The pulley 22 which receives motion from any suitable source is connected to the pulley shaft 23 which has secured to the other end thereof one of said change gears 21 connecting said pulley shaft 23 with the horizontal shaft 24.

The bevel gears 20 connect the horizontal shaft 24 with the vertical cutter driving shaft 19.

A feed screw 25 is suitably arranged in bearings of the main frame 1 and stanchion 2 and co-acts with the threaded portion of the cutter carriage 3, whereby said cutter carriage can be adjusted vertically. To the upper end of said screw 25 is secured a bevel gear 26 meshing with a similar gear 27, the latter being connected to the hand wheel 28 by means of the shaft 29, whereby said screw and therewith the cutters 10 may be adjusted vertically by hand. To the lower end of the feed screw 25, is slidably keyed a clutch 30, which is arranged to engage with the clutch face 31 on the worm wheel 32. Said worm wheel is arranged to rotate freely upon said feed screw 25 and meshes with and is rotated by the worm 33, which is secured to the worm shaft 34. Motion is transmitted to said feed worm shaft 34 by means hereinafter more fully described.

The horizontal shaft 24 has secured thereto a bevel pinion 35 which meshes with the bevel gear 36, secured to and rotated by the index driving shaft 37. Change gears 38 connect said index driving shaft 37 with the index shaft 39. The index worm 40 is slidably keyed to the index shaft 39 and is rotatably mounted in the bearing 41 which is bolted to the work slide 42 by the bolts 43. The index worm 40 meshes with the index wheel 44, which is keyed to the lower end of the work spindle 45. An adjustable spindle bearing 46 in which the work spindle 45 is rotatably mounted is provided in the work spindle head 47, which spindle head is secured to the work slide 42 by a series of bolts 48. A tongue and groove connection 49 is provided between said adjustable spindle bearing 46 and work spindle head 47 so as to properly guide said spindle bearing 46. The purpose of this adjustable spindle bearing will be more fully described hereinafter. A bevel gear 50, preferably integral with said index worm 40 meshes with a similar gear 51, secured to the index worm shaft 52, which is mounted transversely in said work slide 42 and has secured thereto, a second index worm 53 which meshes with a second index wheel, 54. The second index wheel 54 is keyed to the lower end of the work spindle 55, which is rotatably mounted in the work spindle head 47. It is to be noted that the work spindle 55 is not adjustably arranged in the work spindle head 47 in a manner similar to that of the work spindle 45.

The work carriage 42 is adjustable toward and from the cutters 10 by means of the adjusting screw 56 which is rotatably mounted in the main frame 1 and co-acts with the threaded portion 57 of the work slide 42. A square end 58 is provided on said screw 56 to coöperate with a crank handle to manually adjust said work slide 42. A work spindle adjusting screw 59 is rotatably mounted on said work spindle head 47 and co-acts with the threaded portion 60 of the outer support 61, which support is connected to and moves the work spindle 55. Elongated openings 62 are provided in the work spindle support 61 and in the adjustable work spindle bearing 46 to permit the adjustment of said work spindle and support relative to the work carriage 42. Bolts 63 are provided to rigidly secure said work spindle and support to said work spindle head 47. Bolts 64 rigidly connect the work spindle 65 with the outer support 61. The outer support 61 has an upwardly projecting cylindrical column 65 upon which the arm 66 is arranged to support the upper end of the work spindle 45. A similar supporting arm 67 and column 68 is provided for the work spindle 55.

The adjustment of the work carriage 42 on the ways 69 of the main frame 1 toward and from the cutters 10 is to obtain the proper thickness of tooth on the pitch line of the gears that are to be cut on the work spindles. It is well known that to make two helical or hob cutters exact duplicates is a difficult matter, therefore an independent adjustment of one of the work spindles has been provided so that one of said spindles can be readily adjusted independently of the other to compensate for any difference in diameters that may exist between the two helical or hob cutters.

Having described the construction in detail, the operation of the entire mechanism will now be described. Gear blanks are placed upon the work arbors 45 and 55 and the cutters 10 are angularly adjusted in accordance with the nature of the gear to be cut, that is to say, if the gear to be cut is a spur gear, the angular adjustment of the cutters will be that necessary to compensate for the helical angle of the cutters, and if the gears to be cut are helical gears, the angular adjustment will be greater, depending on the helical angle of the gear to be cut. Rotary motion to the cutters is transmitted from the pulley 22 as hereinbefore described. A feeding motion is given to the cutters parallel with the axes of the gear blanks by means of the feed screw, which receives its motion from the index shaft 39 through the gears 70 and feed change gears 71. The clutch 30 is engaged with the clutch face 31 on the worm gear 32 by means of the lever 72 which is pivoted at 73 and connected to said clutch 30 by means of an annular groove 74. The trip rod 75 and trip dog 76 are arranged to coöperate with the abutment 77 on the cutter carriage, whereby the feeding motion can be disconnected at a pre-determined point. The two work spindles receive rotary motion from the pulley as hereinbefore described. The change gears 38 are selected in accordance with the number of teeth to be cut when it is desired to cut spur gears. The feed change gears 71 are selected in accordance with the feed desired for the material to be cut.

After the cutters have been embedded half way in the gear blanks, the thickness of teeth at the pitch line is measured. If it is found that the teeth of the gear blanks mounted on the spindle 45 are too thick, said spindle is adjusted toward the cutter independently of the work spindle 55. If the thickness of tooth of the gear blanks on the spindle 45 is correct and those on the spindle 55 are too thick, then it is necessary to adjust the work slide 42 toward the cutters and move the spindle 45 the same amount away from the cutters.

It will be readily seen that by the adjustments provided, any condition that may arise can easily be taken care of. If it is desired to cut helical gears on both spindles, after having made the necessary angular adjustment of the cutter, the change gears 38 and 71 must be properly correlated so that the feeding motion of the cutters and the rotary motion of the blank will produce in addition to the number of teeth, the proper helix.

Having described my invention, I claim as new and desire to secure by Letters Patent:

1. In a gear cutting machine, the combination of a cutter carriage, a rotatable cutter spindle pivotally arranged upon said cutter carriage, a helical cutter secured to said spindle on each side of the pivotal center, a work carriage, two revoluble work spindles arranged in said work carriage, connections between said cutter and work spindles to rotate same synchronously, and a feeding means to feed said cutters relatively to said work spindles.

2. In a gear cutting machine, the combination of a cutter carriage, a rotatable cutter spindle pivotally arranged upon said cutter carriage, a helical cutter secured to said spindle on each side of the pivotal center, a work carriage, two revoluble work spindles arranged in said work carriage, said work spindles arranged to be adjusted toward and from said cutter spindle, connections between said cutter and work spindles to rotate same synchronously, and a feeding means to feed said cutters relatively to said work spindles.

3. In a gear cutting machine, the combination of a cutter carriage, a rotatable cutter spindle pivotally arranged upon said cutter carriage, a helical cutter secured to said spindle on each side of the pivotal center, a work carriage, arranged to be adjusted toward and from said cutters, two work spindles rotatably mounted in said work carriage, one of said work spindles arranged to be adjusted in said work carriage toward and from said cutter spindle, connections between said cutter and work spindles to rotate same synchronously, and a feeding means to feed said cutters relatively to said work spindles.

4. In a gear cutting machine, the combination of a cutter carriage, a rotatable cutter spindle pivotally arranged upon said cutter carriage, a helical cutter secured to said spindle on each side of the pivotal center, a work carriage arranged to be adjusted toward and from said cutter spindle, two revoluble work spindles mounted in said work carriage, said spindles adjustable relative to each other toward and from said cutter spindle, connections between said cutter and work spindles to rotate same synchronously, and a feeding means to feed said cutters relatively to said work spindles.

5. In a gear cutting machine, the combination of a cutter carriage, a rotatable cutter spindle pivotally arranged upon said cutter carriage, a helical cutter secured to said spindle on each side of the pivotal center, two work spindles arranged to be adjustable toward and from said cutter spindle and relatively to each other, connections between said cutter and work spindles to rotate same synchronously and a feeding means to feed said cutters relatively to said work spindles.

6. In a gear cutting machine, the combination of a cutter carriage, a rotatable cutter spindle pivotally arranged upon said cutter carriage, a helical cutter secured to said spindle on each side of the pivotal center, a work carriage, a work spindle rotatably mounted therein, a spindle bearing slidably mounted on said work carriage, a second work spindle rotatably mounted in said spindle bearing, means to adjust said work carriage, other means to adjust said second mentioned work spindle bearing relatively to said first mentioned work spindle, connections between said cutter and work spindles to rotate same synchronously, and a feeding means to feed said cutters relatively to said work spindles.

7. In a gear cutting machine, the combination of a cutter carriage, a rotatable cutter spindle pivotally arranged upon said cutter carriage, a helical cutter secured to said spindle on each side of the pivotal center, a work carriage, two work spindles rotatably arranged in said work carriage, an index shaft, connections between said index shaft and one of said work spindles, other connections between said index shaft and the other work spindle, other connections between said index shaft and cutter spindle to rotate all of said spindles synchronously, and a feeding means to feed said cutters relatively to said work spindles.

8. In a gear cutting machine, a rotatable cutter spindle arranged to be adjusted about an axis at right angles to said cutter spindle axis, a helical cutter secured to said spindle on each side of said axis, two work spindles arranged to be adjustable toward and from said cutter spindle and relatively to each other, connections between said cutter and work spindles to rotate same synchronously, and a feeding means to feed said cutters and work spindles relatively to each other.

9. In a gear cutting machine the combination of a rotatable cutter spindle, a plurality of helical cutters secured to and rotatable with said spindle, a work carriage, a plurality of rotatable work spindles provided in said work carriage, connections between said cutters and work spindles to rotate same synchronously, and a feeding means to feed said cutters relatively to said work spindles.

10. In a gear cutting machine, the combination of a rotatable cutter spindle, a plurality of helical cutters secured to and rotatable with said spindle, a plurality of revoluble work spindles arranged to be adjustable toward and from said cutter spindle and relatively to each other, connections between said cutter and work spindles to rotate same synchronously, and a feeding means to feed said cutters relatively to said work spindles.

11. In a gear cutting machine, the combination of a rotatable cutter spindle, a driving member to rotate said cutter spindle, a plurality of helical cutters secured to said spindle on each side of said driving member, a plurality of revoluble work spindles arranged to be adjusted toward and from said cutter spindle and relatively to each other, connections between said cutter and work spindles to rotate same synchronously, and a feeding means to feed said cutters relatively to said work spindles.

12. In a gear cutting machine, the combination of a rotatable cutter spindle, a driving member to rotate said cutter spindle, a helical cutter secured to said spindle on each side of said driving member, two revoluble work spindles arranged to be adjustable toward and from said cutter spindle and relatively to each other, connections between said cutters and work spindles to rotate same synchronously, and a feeding means to feed said cutters relative to said work spindles.

WM. F. ZIMMERMANN.